(12) United States Patent
Oyamada

(10) Patent No.: US 8,988,988 B2
(45) Date of Patent: Mar. 24, 2015

(54) COMMUNICATION CONTROL METHOD AND MANAGEMENT APPARATUS

(75) Inventor: Hisashi Oyamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 13/479,740

(22) Filed: May 24, 2012

(65) Prior Publication Data

US 2012/0307627 A1 Dec. 6, 2012

(30) Foreign Application Priority Data

May 30, 2011 (JP) ................................. 2011-120372

(51) Int. Cl.
*H04L 1/00* (2006.01)
*H04L 12/24* (2006.01)
*H04L 12/46* (2006.01)
(Continued)

(52) U.S. Cl.
CPC ........ *H04L 41/0668* (2013.01); *H04L 12/4641* (2013.01); *H04L 69/40* (2013.01); *H04L 45/22* (2013.01); *H04L 45/28* (2013.01)
USPC ........................................... 370/225; 370/235

(58) Field of Classification Search
CPC ............ H04L 12/1886; H04L 12/4641; H04L 41/0816; H04L 41/5054; H04L 45/28
USPC ......................................................... 370/225
See application file for complete search history.

(56) References Cited

U.S. PATENT DOCUMENTS 7,012,919 B1 * 3/2006 So et al. ......................... 370/392
7,523,286 B2 4/2009 Ramany et al.

(Continued)

FOREIGN PATENT DOCUMENTS

JP 2004-336501 11/2004
JP 2008-521140 A 6/2008
(Continued)

OTHER PUBLICATIONS

Partial English translation of previously submitted Non-Patent literature document by Shuichi Ohkubo; "Understanding of infrastructure technology for cloud computing", Nikkei Linux vol. 13 No. 6, Nikkei Business Publications, Inc., May 8, 2011, pp. 118-124.
(Continued)

*Primary Examiner* — Wanda Z Russell
(74) *Attorney, Agent, or Firm* — Fujitsu Patent Center

(57) ABSTRACT

In a communication control method: information processing apparatuses output frames to a first communication apparatus for communication; when a failure in a link between the first communication apparatus and a first one of the information processing apparatuses is detected, the first one of the information processing apparatuses switches the forwarding direction of frames containing tag information from a direction toward the first communication apparatus to a direction toward a second communication apparatus; the management apparatus searches for a second one of the information processing apparatuses which uses the tag information in common with the first one of the information processing apparatuses; and the second one of the plurality of information processing apparatus switches the forwarding direction of frames containing the tag information used in common with the first one of the information processing apparatuses, from a direction toward the first communication apparatus to a direction toward the second communication apparatus.

5 Claims, 19 Drawing Sheets

(51) Int. Cl.
*H04L 29/14* (2006.01)
*H04L 12/707* (2013.01)
*H04L 12/703* (2013.01)

(56) References Cited

U.S. PATENT DOCUMENTS

| | | | |
|---|---|---|---|
| 2003/0179707 A1* | 9/2003 | Bare | 370/235 |
| 2009/0109843 A1* | 4/2009 | Yang | 370/225 |
| 2009/0287831 A1 | 11/2009 | Nakagawa et al. | |
| 2010/0241696 A1 | 9/2010 | Matoba | |
| 2013/0103809 A1* | 4/2013 | Kumbalimutt | 709/220 |

FOREIGN PATENT DOCUMENTS

| | | | |
|---|---|---|---|
| JP | 2009-277089 A | 11/2009 | |
| JP | 2010-191801 A | 9/2010 | |
| JP | 2010-219845 A | 9/2010 | |
| WO | WO-2006/055765 A2 | 5/2006 | |

OTHER PUBLICATIONS

Shuichi Ohkubo, "Understanding of infrastructure technology for cloud computing", Nikkei Linux vol. 13 No. 6, Nikkei Business Publications, Inc., May 8, 2011, pp. 118-124.

JPOA—Office Action mailed Jan. 6, 2015 for corresponding Japanese Application No. 2011-120372, with English translation of relevant part: p. 1 line 19 to p. 2 line 6.

* cited by examiner

FIG. 10

ROUTING MANAGEMENT TABLE 215

| VM1 | | | VM2 | | | VLAN-ID | Switch ID | Detour Flag | Converted VLAN-ID |
|---|---|---|---|---|---|---|---|---|---|
| VM-ID | Server ID | Port ID | VM-ID | Server ID | Port ID | | | | |
| VM#1 | Server#1 | Pif#1 | VM#2 | Server#2 | Pif#1 | 100 | SW#1 | NO | — |
| VM#3 | Server#2 | Pif#1 | VM#4 | Server#3 | Pif#1 | 200 | SW#1 | YES | — |
| ... | ... | ... | ... | ... | ... | ... | ... | ... | ... |

FIG. 11

| VLAN-ID TABLE | | 216 |
|---|---|---|
| VLAN-ID | Use Flag | |
| 1 | NO | |
| 2 | YES | |
| ⋮ | ⋮ | |
| 100 | YES | |
| 101 | NO | |
| ⋮ | ⋮ | |
| 4093 | NO | |
| 4094 | NO | |

FIG. 12

| FAILURE MANAGEMENT TABLE | | | 217 |
|---|---|---|---|
| Server ID | Port ID | Failure Flag | |
| Server#1 | Pif#1 | YES | |
| | Pif#2 | NO | |
| Server#2 | Pif#1 | NO | |
| | Pif#2 | NO | |
| ⋮ | ⋮ | ⋮ | |

COMMUNICATION CONTROL METHOD AND MANAGEMENT APPARATUS

CROSS-REFERENCE TO RELATED APPLICATION

This application is based upon and claims the benefit of priority of the prior Japanese Patent Application No. 2011-120372, field on May 30, 2011, the entire contents of which are incorporated herein by reference.

FIELD

The embodiments discussed herein relate to communication control methods and management apparatuses.

BACKGROUND

The network virtualization technology in which more than one logical network is formed on a physical network is currently in practical use. For example, the tagged VLAN (virtual local area network) is a network virtualization technology. In the tagged VLAN, a tag including a VLAN identifier (VLAN-ID) is inserted in each frame. The communication devices which transfer frames (e.g., layer-2 switches) refer to tags, and control the forwarding directions of the respective frames so as to prevent mixing of a frame from a different VLAN. The tagged VLAN is used, for example, in a layer-2 network formed in a data center for separating frames on a user-by-user basis.

In a first conventionally proposed storage system, operations are load balanced between multiple storages, and a virtual storage system is established. (See, for example, International Patent Publication No. WO2006/055765.)

In a second conventionally proposed system, in order to reduce load concentration, information indicating the status of use of application software is provided to clients, and the clients access an application delivery server on the basis of the information indicating the status of use. (See, for example, Japanese Laid-open Patent Publication No. 2009-277089.)

In a conventionally proposed authentication method executed in a system in which terminals can receive services provided by a server without awareness of the location of the server, authentication of each terminal is enabled by attaching an electronic signature to each service request transmitted from the terminal. (See, for example, Japanese Laid-open Patent Publication No. 2010-191801.)

In a third conventionally proposed system, a repeater device which receives a message originated from a client and addressed to a server brings a tenant ID indicating a tenant to which the client belongs into correspondence with a connection ID. (See, for example, Japanese Laid-open Patent Publication No. 2010-219845.)

Incidentally, in some cases where a virtual network is formed by inserting a tag into a frame, there is an upper limit to the number of virtual networks which can be supported by a communication device, since the value which can be indicated by a tag is limited. For example, the VLAN-ID in the tagged VLAN is represented by 12 bits, and only 4094 VLAN-IDs, other than the two reserved VLAN-IDs, are available. Therefore, the maximum number of VLANs which can be supported by a layer-2 switch is 4094.

On the other hand, in some cases, formation of virtual networks in a number greater than the maximum number of VLANs which can be supported by a layer-2 switch is demanded. For example, formation of more than 4094 virtual networks on a layer-2 network is demanded in a data center.

In order to overcome the above problem, it is possible to consider a method of forming different virtual networks using identical tag information in different locations remote from each other in a physical network by arranging information processing devices performing communication by use of the identical tag information in such a manner that the range in which frames in each virtual network are transmitted is localized. However, according to this method, when the transmission paths are changed by redundancy control in case of failure, frames from different virtual networks using the identical tag information can flow into a communication device, so that collision of tag information can occur.

SUMMARY

In view of the above, there is provided a communication control method which is executed in a system including a first communication apparatus and a second communication apparatus connected through a third communication apparatus and a plurality of information processing apparatuses each connected to both of the first communication apparatus and the second communication apparatus. In the communication control method: the plurality of information processing apparatuses output frames to the first communication apparatus for communication. When a failure in a link between the first communication apparatus and a first one of the plurality of information processing apparatuses is detected, the forwarding direction of frames containing tag information and being outputted from the first one of the plurality of information processing apparatuses is switched from a direction toward the first communication apparatus to a direction toward the second communication apparatus; a second one of the plurality of information processing apparatuses which uses the tag information in common with the first one of the plurality of information processing apparatuses is searched for; and the forwarding direction of frames containing the tag information used in common with the first one of the plurality of information processing apparatuses and being outputted from the second one of the plurality of information processing apparatuses is switched from a direction toward the first communication apparatus to a direction toward the second communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a routing management table;

FIG. 11 illustrates an example of a VLAN-ID table;

FIG. 12 illustrates an example of a failure management table;

DESCRIPTION OF EMBODIMENTS

The embodiments will be explained below with reference to the accompanying drawings, wherein like reference numbers refer to like elements throughout.

1. First Embodiment

Figure 1:
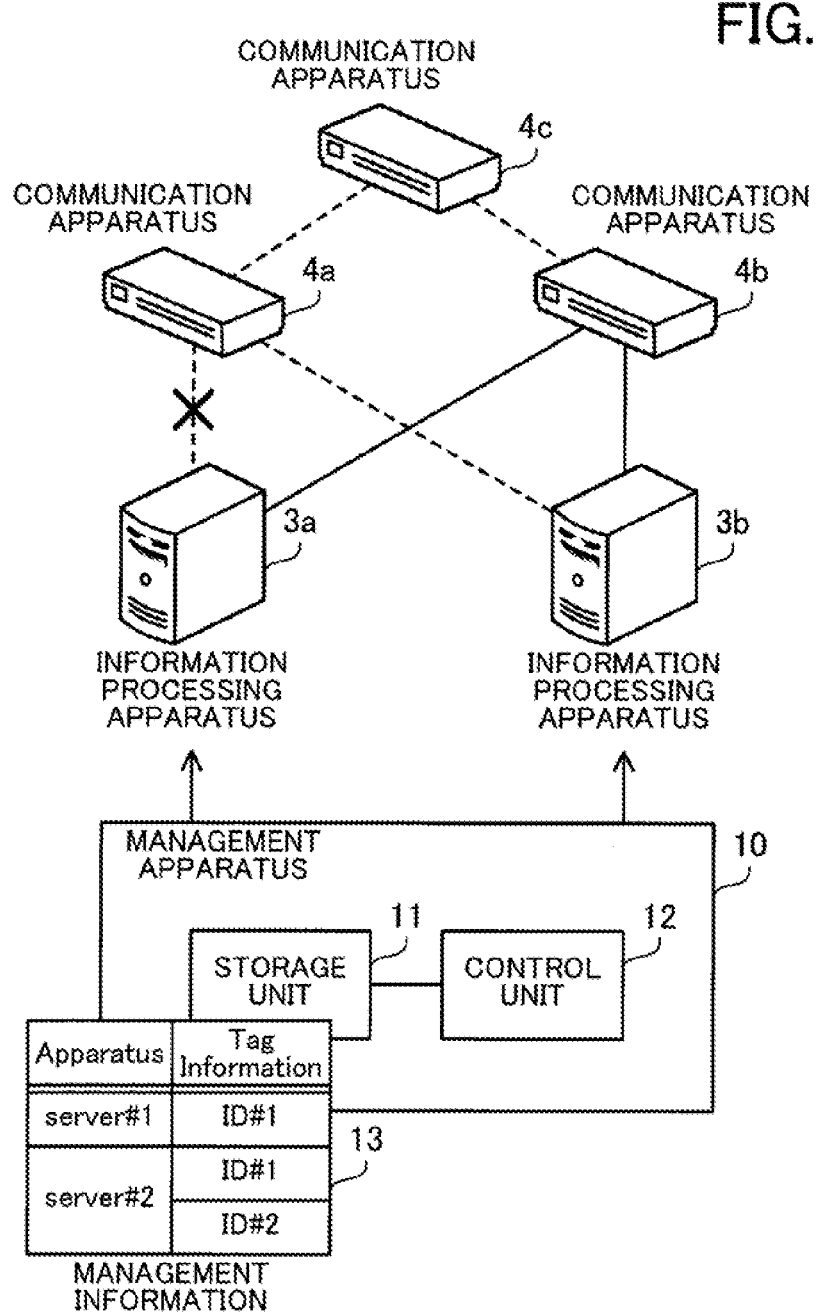
FIG. 1 illustrates a communication system according to a first embodiment.

FIG. 1 illustrates a communication system according to the first embodiment. Frames each containing a tag are transmitted in the communication system according to the first embodiment. For example, the communication system of FIG. 1 can be realized as a layer-2 network in which MAC frames each containing a VLAN tag are transmitted.

The communication system according to the first embodiment contains a plurality of information processing apparatuses, communication apparatuses 4*a*, 4*b*, and 4*c*, and a management apparatus 10, where the information processing apparatuses include information processing apparatuses 3*a* and 3*b*. Each of the information processing apparatuses 3*a* and 3*b* is connected to both of the communication apparatuses 4*a* and 4*b*, and each of the communication apparatuses 4*a* and 4*b* is connected to the communication apparatus 4*c*, which belongs to an upper layer. For example, the communication apparatuses 4*a*, 4*b*, and 4*c* may be layer-2 switches.

Since each of the information processing apparatuses 3*a* and 3*b* is connected to both of the communication apparatuses 4*a* and 4*b*, the route for frame transmission is redundantly arranged. Therefore, each of the information processing apparatuses 3*a* and 3*b* outputs frames to the communication apparatus 4*a* during normal operation. When a failure in the link between the communication apparatus 4*a* and each of the information processing apparatuses 3*a* and 3*b* is detected, the information processing apparatus 3*a* or 3*b* informs the management apparatus 10 of the occurrence of the failure, and switches the forwarding direction of frames from the direction toward the communication apparatus 4*a* to the direction toward the communication apparatus 4*b* in accordance with an instruction from the management apparatus 10.

The management apparatus 10 controls the forwarding directions of frames in the information processing apparatuses 3*a* and 3*b*. The management apparatus 10 contains a storage unit 11 and a control unit 12. The management apparatus 10 may be a server computer connected to a network, or a terminal operated by an administrator. The control unit 12 may be realized by execution, by a CPU (central processing unit), of a program stored in a RAM (random access memory), where the CPU and the RAM are contained in the server computer or the terminal. Alternatively, the control unit 12 may be realized by circuitry using, for example, an FPGA (field programmable gate array) or an ASIC (application specific integrated circuit).

The storage unit 11 stores management information 13. The storage unit 11 may be realized by a volatile memory device such as a RAM or a nonvolatile storage device such as a HDD (hard disk drive). The management information 13 indicates correspondences between the values of the tag information and the plurality of information processing apparatuses including the information processing apparatuses 3*a* and 3*b*. For example, the management information 13 indicates that the information processing apparatus 3*a* uses the tag #1, and the information processing apparatus 3*b* uses the tag #2 and tag #3. The tag information includes, for example, the VLAN-ID.

The control unit 12 detects a link failure occurring in the link between the communication apparatus 4*a* and one of the information processing apparatuses. For example, the control unit 12 recognizes the link failure on the basis of a report from the one of the information processing apparatuses, which is connected to the communication apparatus 4*a* through the failed link. The control unit 12 searches the management information 13 (stored by the storage unit 11) for another information processing apparatus (e.g., the information processing apparatus 3*b*) using tag information in common with the above information processing apparatus (e.g., the information processing apparatus 3*a*) connected to the communication apparatus 4*a* through the failed link. In addition, the control unit 12 instructs the information processing apparatus (3*a*) connected to the communication apparatus 4*a* through the failed link to switch the forwarding direction of frames from the direction toward the communication apparatus 4*a* to the direction toward the communication apparatus 4*b*. Further, the control unit 12 instructs the other information processing apparatus (3*b*) searched for as above to switch the forwarding direction of frames containing the above tag information in common with the information processing apparatus (3*a*) connected to the communication apparatus 4*a* through the failed link, from the direction toward the communication apparatus 4*a* to the direction toward the communication apparatus 4*b*.

For example, when a link failure occurs in the link between the information processing apparatus 3*a* and the communication apparatus 4*a*, the control unit 12 searches for the information processing apparatus 3*b* as an information processing apparatus, other than the information processing apparatus 3*a*, which performs communication by use of the tag #1. Then, the control unit 12 instructs the information processing apparatus 3*a* to switch the forwarding direction of frames to the direction toward the communication apparatus 4*b*, and instructs the information processing apparatus 3*b* to switch the forwarding direction of frames containing the tag #1 to the direction toward the communication apparatus 4*b*. At this time, the forwarding direction of frames containing the tag #2 (which is not used by the information processing apparatus 3*a*) need not be switched to the direction toward the communication apparatus 4*b*, and may be remained at the direction toward the communication apparatus 4*a*.

More than one virtual machine may run on each of the information processing apparatuses 3*a* and 3*b*, and different virtual machines operating on an information processing apparatus may use different tag information in frames. The information processing apparatus 3*b*, which switches the forwarding direction on occurrence of a link failure in the link with the information processing apparatus 3a, may determine the forwarding direction of frames for each virtual machine.

In the communication system according to the first embodiment, the plurality of information processing apparatuses including the information processing apparatuses 3a and 3b normally perform communication by outputting frames to the communication apparatus 4a. When a failure in the link between the communication apparatus 4a and the information processing apparatus 3a is detected, the forwarding direction of frames at the information processing apparatus 3a is switched to the direction toward the communication apparatus 4b. In addition, the management apparatus 10 searches the plurality of information processing apparatuses for the information processing apparatus 3b as an information processing apparatus which performs communication by use of the tag information in common with the information processing apparatus 3a. Then, the forwarding direction of the frames being outputted from the information processing apparatus 3b and containing the tag information in common with the information processing apparatus 3a is switched to the direction toward the communication apparatus 4b.

As explained above, when the forwarding direction of frames at the information processing apparatus 3a is switched on occurrence of a failure, switching of the forwarding direction of frames containing the tag information in common with the information processing apparatus 3a is also performed at the information processing apparatus 3b. Therefore, the communication performed by the communication apparatus 4a with the information processing apparatuses in the lower layer in a closed manner is replaced with the communication performed by the communication apparatus 4b with the information processing apparatuses in the lower layer in a closed manner, so that it is possible to suppress transfer of frames containing the tag information to the upper layer.

Since the communication using the same tag information is localized, it is possible to suppress collision between tag information in a virtual network and tag information in another virtual network. Therefore, for example, it is possible to form, in a single layer-2 network, VLANs in a number greater than the upper limit, 4094, of the number of VLAN-IDs.

2. Second Embodiment

Figure 2:
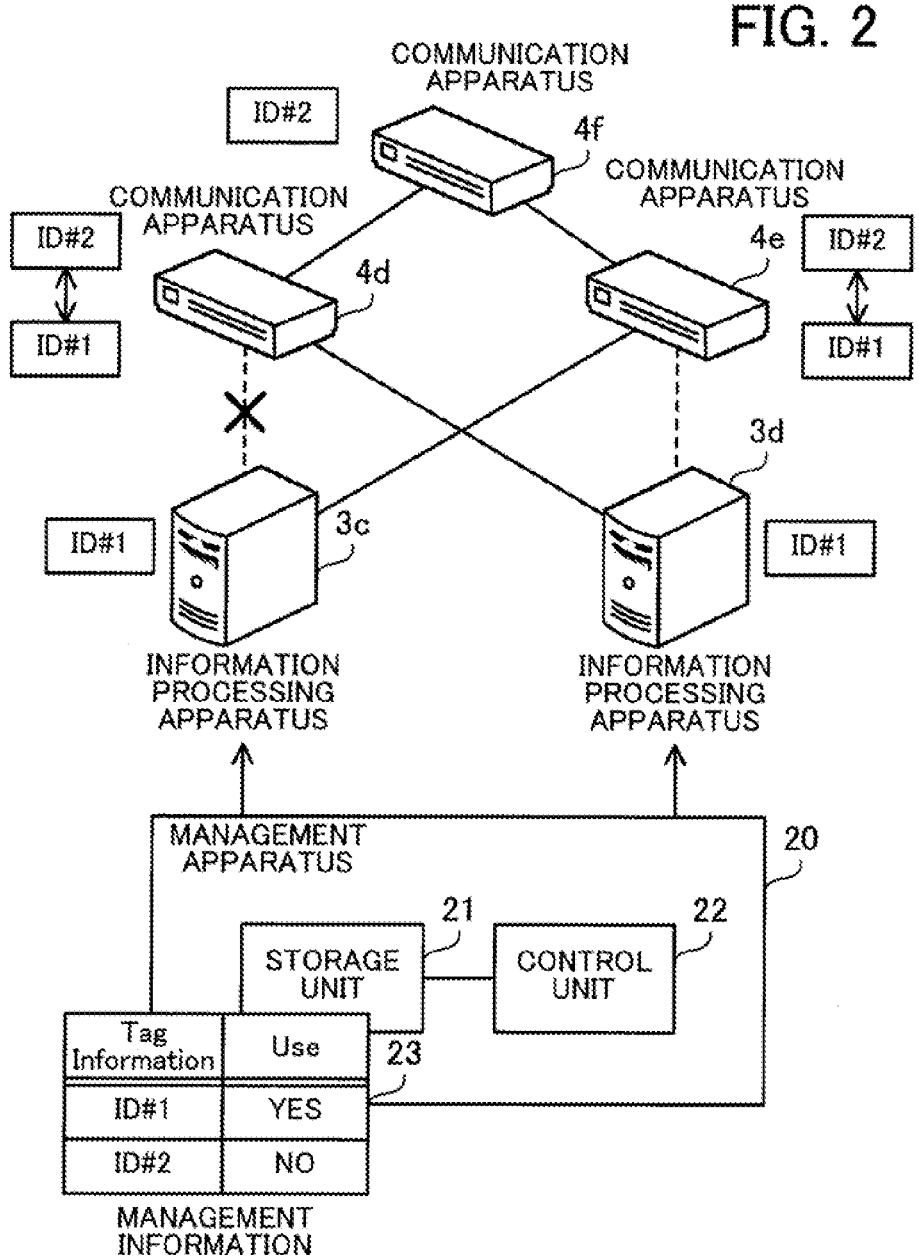
FIG. 2 illustrates a communication system according to a second embodiment.

FIG. 2 illustrates a communication system according to the second embodiment. As in the first embodiment, frames each containing a tag are transmitted in the communication system according to the second embodiment.

The communication system according to the second embodiment contains a plurality of information processing apparatuses, communication apparatuses 4d, 4e, and 4f, and a management apparatus 20, where the information processing apparatuses include information processing apparatuses 3c and 3d. Each of the information processing apparatuses 3c and 3d is connected to both of the communication apparatuses 4d and 4e, and each of the communication apparatuses 4d and 4e is connected to the communication apparatus 4f, which belongs to an upper layer.

Since each of the information processing apparatuses 3c and 3d is connected to both of the communication apparatuses 4d and 4e, as in the first embodiment, the route for frame transmission is redundantly arranged. Therefore, each of the information processing apparatuses 3c and 3d outputs frames to the communication apparatus 4d during normal operation.

The management apparatus 20 controls the forwarding direction of each frame outputted from the information processing apparatus 3c or 3d. The management apparatus 20 contains a storage unit 21 and a control unit 22.

The storage unit 21 stores management information 23. The storage unit 21 may be realized by a volatile memory device such as a RAM or a nonvolatile storage device such as a HDD (hard disk drive). The management information 23 indicates the status of use of the tag information in the communication apparatus 4f. For example, the management information 23 indicates a situation that frames containing the tag #1 are flowing into the communication apparatus 4f, and frames containing the tag #2 are not flowing into the communication apparatus 4f. The tag information includes, for example, the VLAN-ID.

When the control unit 22 detects a link failure occurring in the link between the communication apparatus 4d and one of the information processing apparatuses (e.g., the information processing apparatus 3c), the control unit 22 instructs the information processing apparatus (3c) connected to the communication apparatus 4d through the failed link to switch the forwarding direction of frames from the direction toward the communication apparatus 4d to the direction toward the communication apparatus 4e. In addition, the control unit 22 refers to the management information 23 stored by the storage unit 21, and determines whether or not the tag information used by the information processing apparatus (3c) connected to the communication apparatus 4d through the failed link is already used by the communication apparatus 4f in the upper layer. When yes is determined, the management apparatus 20 selects other tag information which is not used by the communication apparatus 4f, and instructs the communication apparatuses 4d and 4e to convert the already used tag information in frames to the selected tag information before transferring the frames to the communication apparatus 4f. When no is determined, the communication apparatuses 4d and 4e are allowed to transfer the frames without converting the tag information.

For example, when a link failure occurs in the link between the information processing apparatus 3c and the communication apparatus 4d, the control unit 22 instructs the information processing apparatus 3c to switch the forwarding direction of frames to the direction toward the communication apparatus 4e. Thus, frames can be transmitted between the information processing apparatuses 3c and 3d through the communication apparatus 4f in the upper layer. In the communication between the information processing apparatuses 3c and 3d through the communication apparatus 4f, when the control unit 22 confirms that a frame containing the tag #1 used by the information processing apparatus 3c already flows into the communication apparatus 4f, the control unit 22 instructs the communication apparatuses 4d and 4e to convert the tag #1 to the tag #2.

That is, the frames being outputted from the information processing apparatus 3c and each having the tag #1 undergo the conversion of the tag #1 to the tag #2 in the communication apparatus 4e, and are transferred to the communication apparatus 4f in the upper layer. Then, the frames are transferred from the communication apparatus 4f to the communication apparatus 4d. In the communication apparatus 4d, the tag #2 is converted to the tag #1, and the frames are transferred from the communication apparatus 4d to the information processing apparatus 3d. Similarly, frames outputted from the information processing apparatus 3d and addressed to the information processing apparatus 3c are transferred through the communication apparatus 4f.

The above operations including the conversion of the tag information and the transfer of frames through the communication apparatus 4f may be performed only in the case where the information processing apparatus 3d cannot switch the forwarding direction of frames from the direction toward the communication apparatus 4d to the direction toward the communication apparatus 4e. In the case where the information processing apparatus 3d can switch the forwarding direction of frames from the direction toward the communication apparatus 4d to the direction toward the communication apparatus 4e, the frames can be transmitted between the information processing apparatuses 3c and 3d without being relayed by the communication apparatus 4f as in the first embodiment.

In the communication system according to the second embodiment, the information processing apparatuses 3c and 3d normally output frames containing the first tag information (tag #1) to the communication apparatus 4d for communication with each other. When the first tag information is not used by the communication apparatus 4f, the communication apparatuses 4d and 4e transfer frames containing the first tag information to the communication apparatus 4f. When the first tag information is used by the communication apparatus 4f, the management apparatus 20 instructs the communication apparatuses 4d and 4e to convert the first tag information in frames to the second tag information before transferring the frames to the communication apparatus 4f.

As explained above, it is possible to suppress collision of the tag information contained in frames by conversion of the tag information, even when a route for communication between information processing apparatuses which is relayed by the communication apparatus 4d before occurrence of a failure is changed to a route relayed by the communication apparatus 4f after the occurrence of the failure. Since communication using each value of tag information is localized during normal operation, it is possible to form multiple virtual networks using an identical value of tag information in a physical network.

3. Third Embodiment

Figure 3:
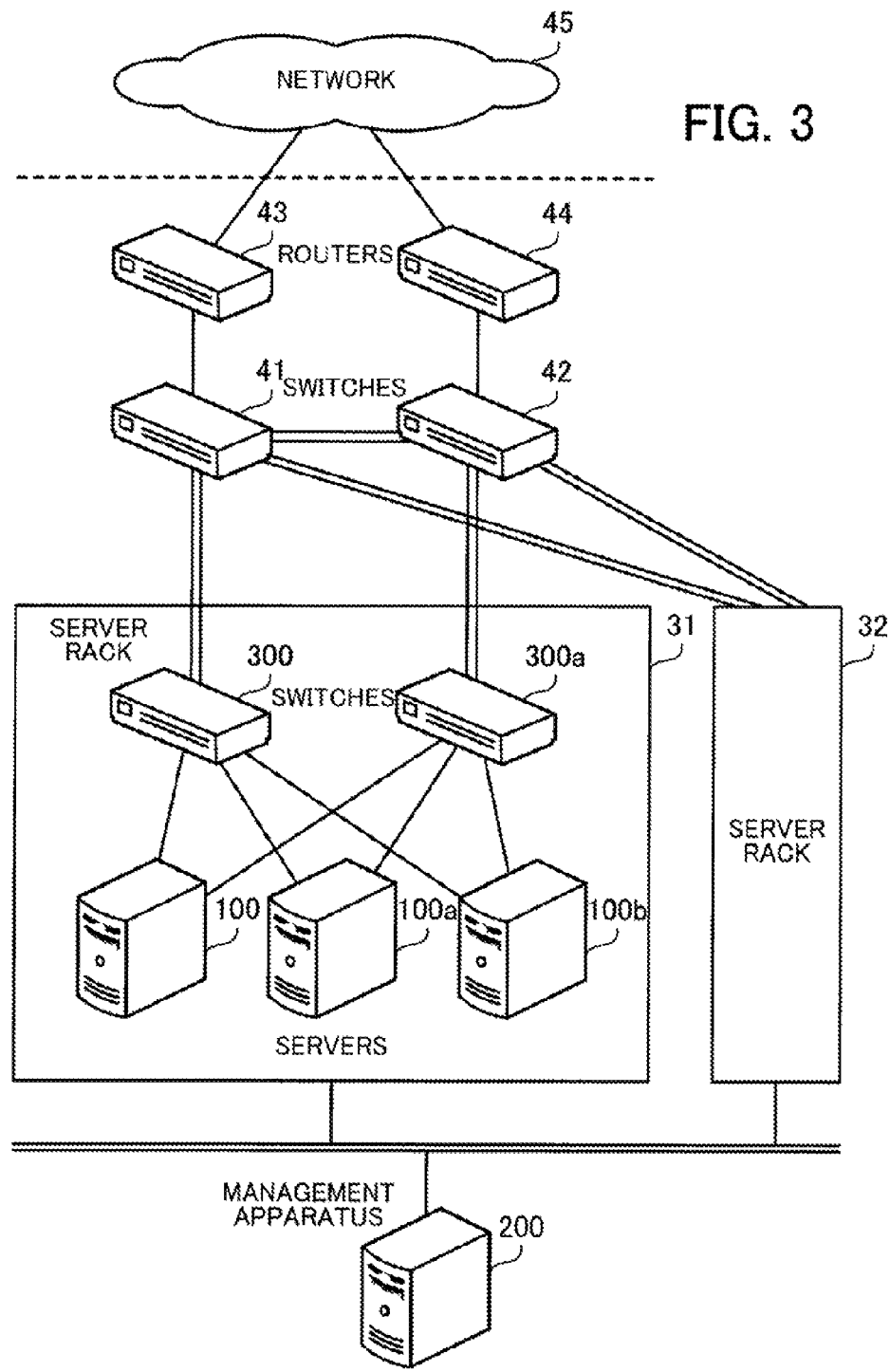
FIG. 3 illustrates a communication system according to a third embodiment.

FIG. 3 illustrates a communication system according to the third embodiment. The communication system according to the third embodiment contains a plurality of servers including servers 100, 100a, and 100b, a management apparatus 200, switches 41, 42, 300, and 300a, and routers 43 and 44. The communication system of FIG. 3 can be realized, for example, as a system in a data center.

The servers 100, 100a, and 100b and the switches 300 and 300a are mounted on a server rack 31. In addition, servers and switches are also mounted on a server rack 32. The routers 43 and 44 separate the inner side (the server rack side) and the outer side (the network 45 side). A layer-2 network is formed on the inner side of the routers 43 and 44.

The servers 100, 100a, and 100b are computers which can be used by multiple users. One or more virtual machines each established for a user run on each of the servers 100, 100a, and 100b in order to separate information processing into parts for the respective users. For example, an operating system (OS) runs for each virtual machine. In order to separate layer-2 communications into parts for the respective users, frames each containing a VLAN tag are transmitted. For example, one or more VLAN-IDs are allocated to each user.

The management apparatus 200 is a computer for managing the servers 100, 100a, and 100b and the switches 300 and 300a. The management apparatus 200 may be either a server or a client. The management apparatus 200 changes one or more routes for transmission of frames, for example, when a link failure occurs.

The switches 41, 42, 300, and 300a are communication apparatuses which perform frame processing in the MAC (media access control) layer (i.e., layer 2), and may be layer-2 switches. Specifically, the switches 300 and 300a are server-level switches, and transfer frames between the servers 100, 100a, and 100b, and between the switches 41 and 42 and the servers 100, 100a, and 100b. The switches 41 and 42 are aggregate-level switches, and transfer frames between the server racks 31 and 32, and between the switch 41 or 42 and the server racks 31 and 32.

The routers 43 and 44 are communication apparatuses which perform packet processing in the IP (Internet protocol) layer (i.e., layer 3), and may be layer-3 switches or communication apparatuses which perform communication processing above layer 3. The routers 43 and 44 transfer packets to the network 45, and receive packets transferred from the network 45. Users who wish to use the servers 100, 100a, and 100b access the layer-2 network formed on the inner side of the routers 43 and 44, from a client connected to the network 45, through the routers 43 and 44.

In the communication system of FIG. 3, various apparatuses and various links are redundantly arranged. As mentioned before, the multiple server-level switches (300 and 300a) are mounted on the server rack 31. Each of the servers 100, 100a, and 100b is connected to both of the switches 300 and 300a, selects one of the switches 300 and 300a, and outputs frames to the selected one of the switches 300 and 300a. In addition, as mentioned before, the multiple server-level switches (41 and 42) are arranged. The switch 300 is connected to the switch 41, and the switch 300a is connected to the switch 42. Each of the link between the switches 41 and 300, the link between the switches 42 and 300a, and the link between the switches 41 and 42 is redundantly arranged by using multiple cables. Further, the routers 43 and 44 constitute a redundant routing arrangement in accordance with a protocol such as VRRP (virtual router redundancy protocol). The switch 41 is connected to the router 43, and the switch 42 is connected to the router 44.

The switches 41, 42, 300, and 300a support VLANs. When virtual machines for a great number of users rub on the layer-2 network, a great number of VLANs can be formed. For example, in some cases where each user uses four virtual machines respectively for a firewall (FW), a web server, an application (AP) server, and a database (DB), two VLANs are formed for each user in order to separate the communication between the firewall and the web server and the communication between the firewall, the AP server, and the database.

Therefore, it is preferable that VLANs in a number greater than the upper limit, 4094, of the number of VLAN-IDs which can be allocated to users can be formed in a single layer-2 network. In order to form VLANs as above, multiple virtual machines for each user are arranged on a server rack so that transmission of frames containing a VLAN-ID is localized and relaying, by the switch 41 or 42, of the frames containing a VLAN-ID is minimized. Further, different VLANs using an identical VLAN-ID are formed on different server racks.

The servers 100, 100a, and 100b are examples of the aforementioned information processing apparatuses 3a, 3b, 3c, and 3d, the management apparatus 200 is an example of the aforementioned management apparatus 10 or 20, the switches 300 and 300a are examples of the aforementioned communication apparatuses 4a and 4b or the aforementioned communication apparatuses 4d and 4e, and the switches 41 and 42 are examples of the aforementioned communication apparatus 4c or 4f.

Figure 4:
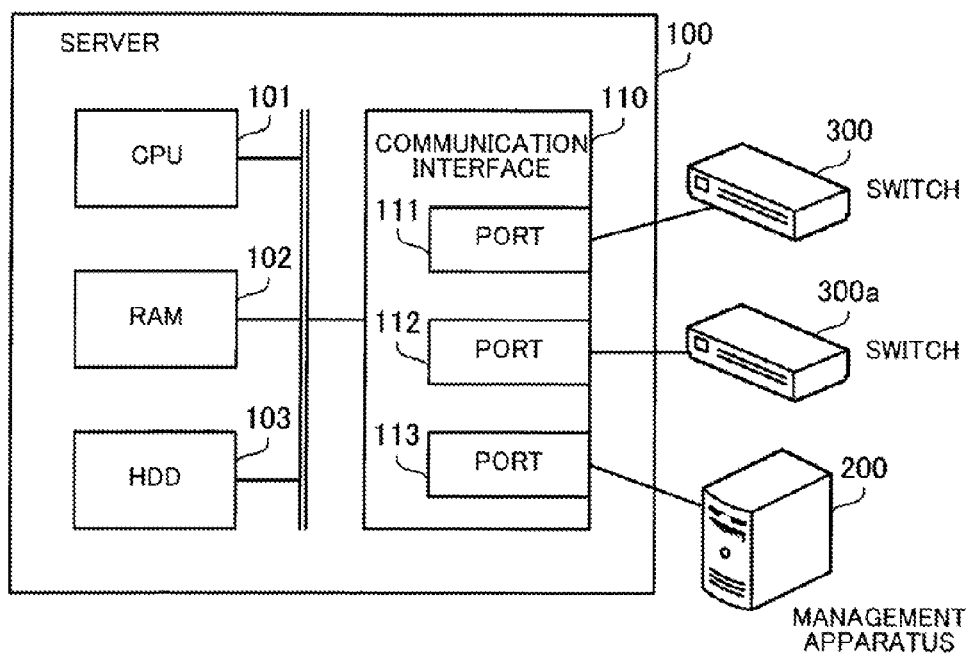
FIG. 4 is a block diagram of an example of a construction of a server.

FIG. 4 is a block diagram of an example of a construction of the server 100. The server 100 contains a CPU 101, a RAM 102, an HDD 103, and a communication interface 110. Modules of the CPU 101, the RAM 102, the HDD 103, and the communication interface 110 are connected to a bus. Each of the servers 100a and 100b can also be realized by a hardware construction similar to the server 100.

The CPU 101 is a processing device which controls information processing performed by the server 100. The CPU 101 reads at least portions of programs and at least portions of data stored in the HDD 103, loads the at least portions of the programs and the at least portions of the data on the RAM 102, and executes the at least portions of the programs. The server 100 may have multiple processors and execute the one or more programs in a distributed manner.

The RAM 102 is a volatile memory device which temporarily stores at least portions of programs which are executed by the CPU 101, as well as data necessary for processing by the CPU 101. The server 100 may further contain memory devices other than the RAM.

The HDD 103 is a nonvolatile memory device which stores programs including an OS (operating system) program and application programs, and data which can be used in the information processing. The HDD 103 writes and reads data in and from one or more magnetic disks built in the HDD 103 in accordance with instructions from the CPU 101. The server 100 may further have a nonvolatile memory device of a type different from the HDD, for example, a solid-state drive (SSD).

The communication interface 110 transmits and receives frames each containing a VLAN tag. The communication interface 110 contains ports 111, 112, and 113. The port 111 is connected to the switch 300, the port 112 is connected to the switch 300a, and the port 113 is connected to the management apparatus 200 through a communication apparatus or the like.

Figure 5:
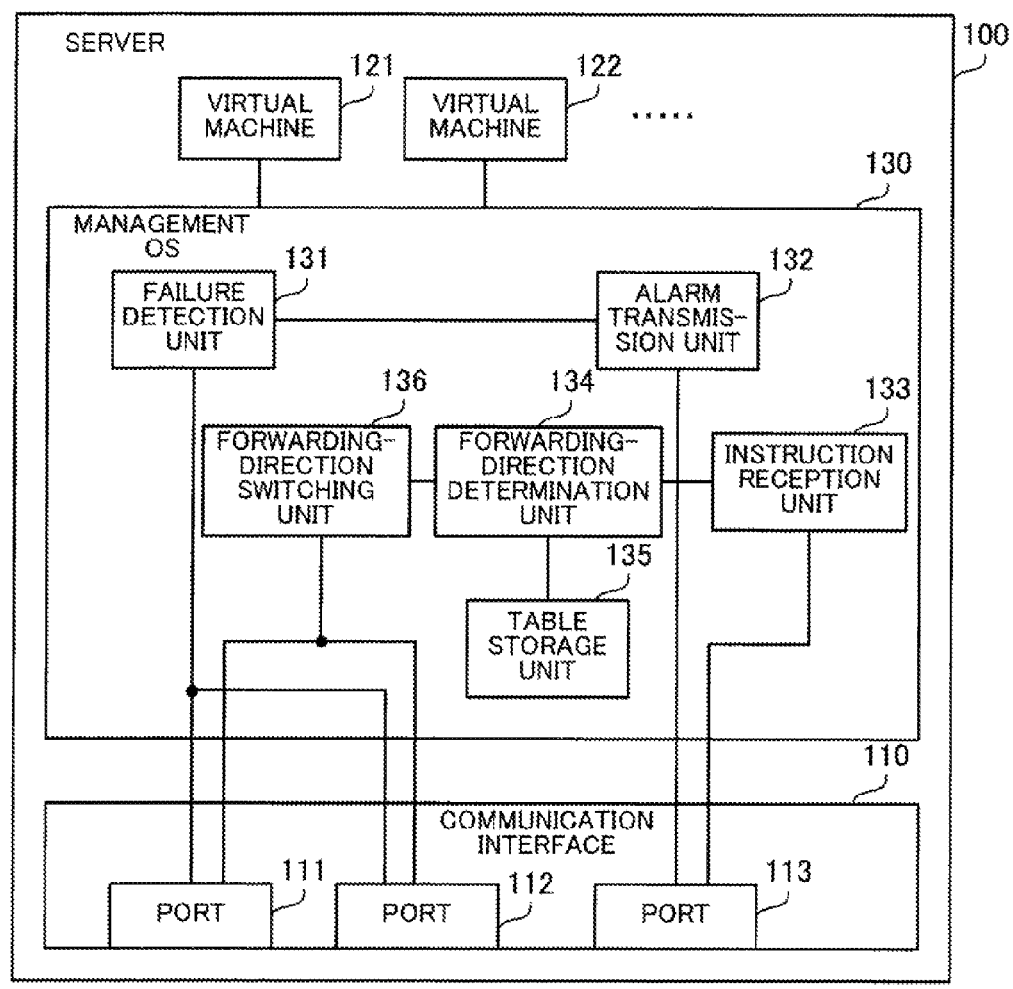
FIG. 5 is a block diagram of an example of an arrangement for realizing redundancy control in a server.

FIG. 5 is a block diagram of an example of an arrangement for realizing redundancy control in the server 100. When the CPU 101 in the server 100 executes predetermined programs, multiple virtual machines including virtual machines 121 and 122 and a management OS (operating system) 130 run on the server 100.

The virtual machines 121 and 122 are virtual computers for use by users. An OS runs for each virtual machine, and a VLAN-ID is allocated to each virtual machine. When each of the virtual machines 121 and 122 performs communication with another virtual machine used by the same user as the virtual machine 121 or 122, the virtual machine 121 or 122 transmits and receives frames containing a VLAN tag to and from the opposite virtual machine.

The management OS 130 manages the virtual machines 121 and 122. The management OS 130 contains a failure detection unit 131, an alarm transmission unit 132, an instruction reception unit 133, a forwarding-direction determination unit 134, a table storage unit 135, and a forwarding-direction switching unit 136. The table storage unit 135 can be realized, for example, by a storage area secured in the RAM 102 or the HDD 103. The units 131 to 134 and 136 in the management OS 130 can be respectively realized by program modules.

The failure detection unit 131 monitors the status of reception of frames at the ports 111 and 112 (respectively connected to the switches 300 and 300a), and detects a link failure in the link between the server 100 and the switch 300 and the link between the server 100 and the switch 300a. When a link failure is detected in one of the links, the failure detection unit 131 informs the alarm transmission unit 132 of an identifier of the port (port ID) connected to the failed link.

When a link failure is detected by the failure detection unit 131, the alarm transmission unit 132 transmits an alarm message to the management apparatus 200 through the port 113, where the alarm message indicates the occurrence of the failure, and contains an identifier of the server 100 and the port ID of the port connected to the failed link.

The instruction reception unit 133 receives from the management apparatus 200 through the port 113 an instruction to switch the forwarding direction of frames. In the case where the forwarding direction of only a part of frames is to be switched, the instruction can contain a VLAN-ID of the part of frames to be switched. When the instruction reception unit 133 receives the instruction, the instruction reception unit 133 informs the forwarding-direction determination unit 134 of the instruction.

The forwarding-direction determination unit 134 manages for each VLAN a port from which frames are to be outputted. When the instruction reception unit 133 receives the instruction to switch the forwarding direction, the forwarding-direction determination unit 134 refers to the table storage unit 135, and determines the correspondence between each VLAN and the port (111 or 112) after the switching. Then, the forwarding-direction determination unit 134 indicates to the forwarding-direction switching unit 136 the forwarding direction for each VLAN.

The table storage unit 135 stores a forwarding-direction management table, which indicates the correspondence between each VLAN-ID and a port ID. The forwarding-direction management table is updated in accordance with instructions from the management apparatus 200.

The forwarding-direction switching unit 136 delivers frames containing a VLAN tag so that each frame is outputted through the port 111 or 112 in accordance with the instruction from the forwarding-direction determination unit 134.

It is possible to consider a plurality of manners of switching of the forwarding direction in the servers 100, 100a, and 100b for each VLAN. For example, in a first manner, a function of port redundancy (bonding function) which an existing driver operating on the management OS 130 has is extended by adding a new bonding mode to the function of port redundancy. In a second manner, a new driver having a function of port redundancy is arranged to operate on the management OS 130. In a third manner, hardware for switching the forwarding direction is arranged between the management OS 130 and the ports 111 and 112. In the server 100 having the construction illustrated in FIG. 5, the switching of the forwarding direction is realized in the first and second manners.

Figure 6:
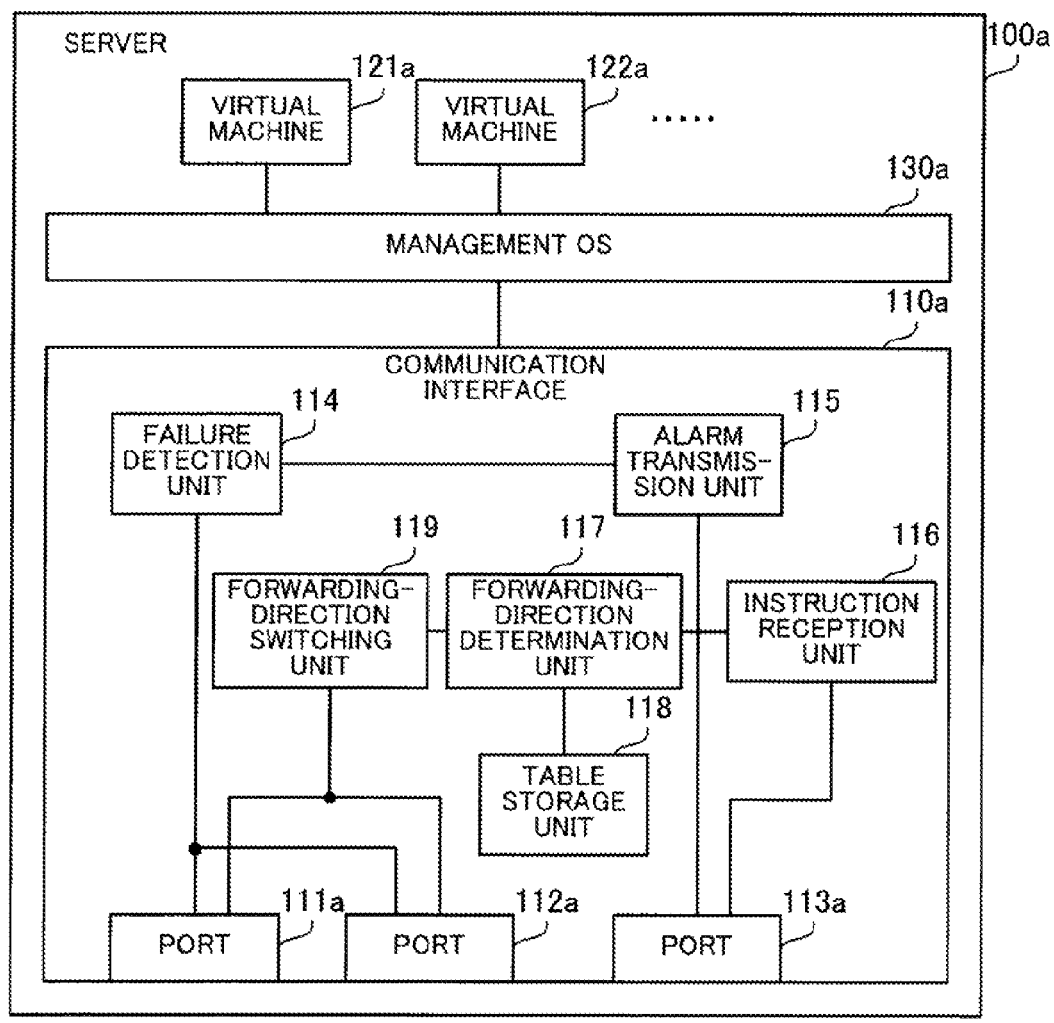
FIG. 6 is a block diagram of another example of an arrangement for realizing redundancy control in a server.

As an alternative to the construction of FIG. 5, another example of an arrangement in the server in which the switching of the forwarding direction is realized in the third manner is illustrated in FIG. 6. The server 100a contains a communication interface 110a, and a management OS 130a and multiple virtual machines including virtual machines 121a and 122a run on the server 100a. The communication interface 110a contains ports 111a, 112a, and 113a, a failure detection unit 114, an alarm transmission unit 115, an instruction reception unit 116, a forwarding-direction determination unit 117, a table storage unit 118, and a forwarding-direction switch unit 119. The units 114 to 119 in the management OS 130a have functions corresponding to the units having the same names and being realized in the management OS 130 in the server 100 of FIG. 5, respectively. The units 114 to 119 in the management OS 130a are realized by hardware.

Figure 7:
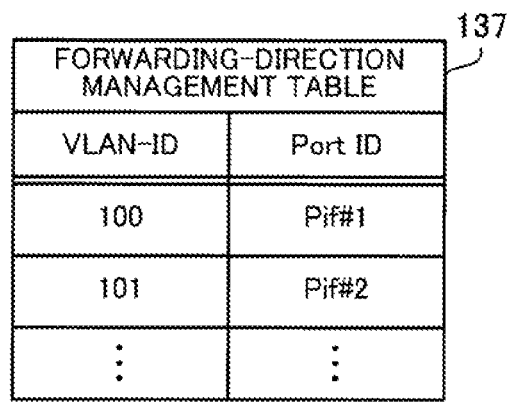
FIG. 7 illustrates an example of a forwarding-direction management table.

FIG. 7 illustrates an example of the forwarding-direction management table stored in the table storage unit 135. The forwarding-direction management table 137 indicates through which of the ports 111 and 112 frames having each VLAN are to be outputted. The forwarding-direction management table of FIG. 7 contains the fields of the VLAN-ID and the port ID. In the field of the VLAN-ID, VLAN-IDs used by the virtual machines running on the server 100 are recorded. In the field of the port ID, an identifier of one of the ports 111 and 112 corresponding to each of the VLAN-IDs in the field of the VLAN-ID is recorded.

Figure 8:
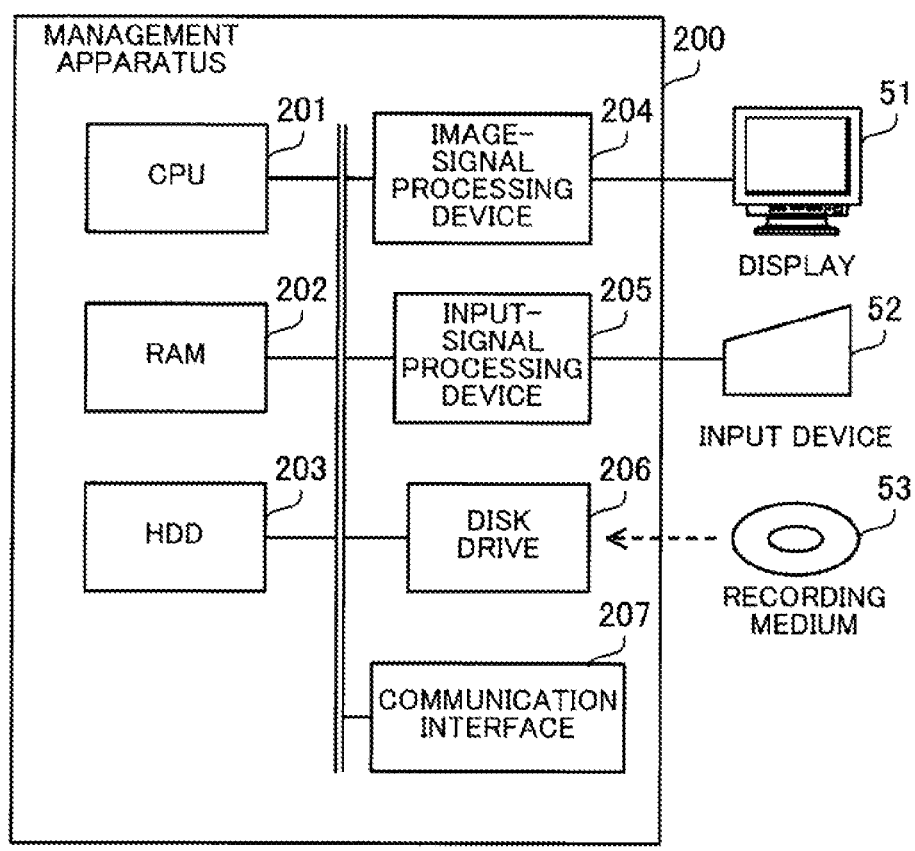
FIG. 8 is a block diagram of an example of a construction of a management apparatus.

FIG. 8 is a block diagram of an example of a construction of the management apparatus 200. The management apparatus 200 contains a CPU 201, a RAM 202, an HDD 203, an image-signal processing unit 204, an input-signal processing unit 205, a disk drive 206, and a communication interface 207. Modules of the CPU 201, the RAM 202, the HDD 203, the input-signal processing unit 205, the disk drive 206 and the communication interface 207 are connected to a bus in the management apparatus 200.

The CPU 201 is a processing device which controls information processing performed by the management apparatus 200. The CPU 201 reads at least portions of programs and at least portions of data stored in the HDD 203, loads the at least portions of the programs and the at least portions of the data on the RAM 202, and executes the at least portions of the programs.

The RAM 202 is a volatile memory device which temporarily stores at least portions of programs which are executed by the CPU 201, as well as data necessary for processing by the CPU 201.

The HDD 203 is a nonvolatile memory device which stores programs including an OS (operating system) program and application programs, and data which can be used in the information processing. The HDD 203 writes and reads data in and from one or more magnetic disks built in the HDD 203 in accordance with instructions from the CPU 201.

The image-signal processing unit 204 outputs image data to a display device 51 connected to the management apparatus 200, in accordance with instructions from the CPU 201. The display device 51 may be a CRT (cathode ray tube) display or a liquid crystal display, or the like.

The input-signal processing unit 205 acquires input signals from an input devices 52 connected to the management apparatus 200, in accordance with instructions from the CPU 201. The input devices 52 may include a keyboard, a pointing device, and the like. The pointing device may include a mouse, a touchscreen, and the like.

The disk drive 206 is a driver device which reads programs and data recorded in a recording medium 53. The recording medium 53 may be a magnetic disk such as a flexible disk (FD) or an HDD, an optical disk such as a CD (compact disk) or a DVD (digital versatile disk), or a magneto-optical disk (MO). The disk drive 206 stores the programs and data read from the recording medium 53, in the RAM 202 or the HDD 203, for example, in accordance with instructions from the CPU 201.

The communication interface 207 is provided for communication with various apparatuses such as servers 100, 100*a*, and 100*b* and switches 300 and 300*a*.

Figure 9:
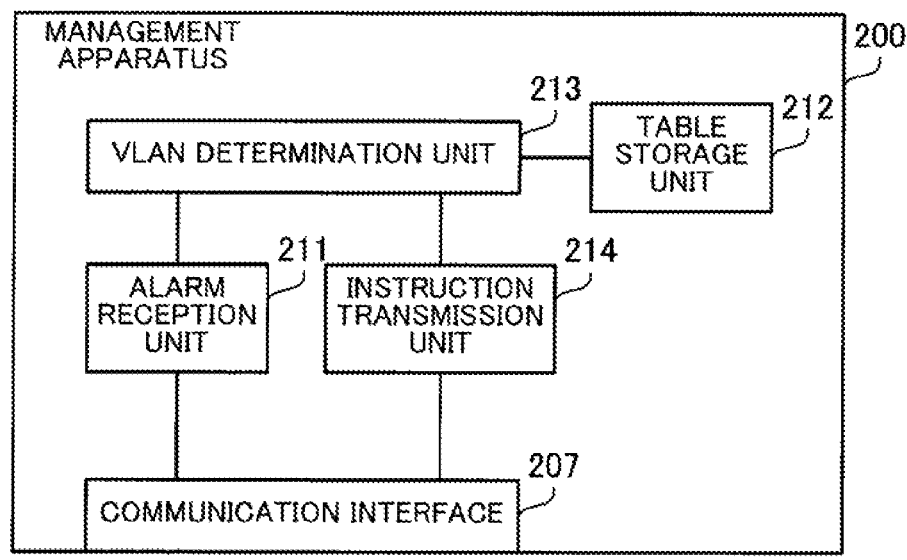
FIG. 9 is a block diagram of an example of an arrangement for realizing routing control in the management apparatus.

FIG. 9 is a block diagram of an example of an arrangement for realizing routing control in the management apparatus 200. The management apparatus 200 contains an alarm reception unit 211, a table storage unit 212, a VLAN determination unit 213, and an instruction transmission unit 214. The table storage unit 212 can be realized, for example, by a storage area secured in the RAM 202 or the HDD 203. The units 211, 213, and 214 in the management apparatus 200 can be respectively realized by program modules.

The alarm reception unit 211 receives an alarm message indicating occurrence of a failure from the servers 100, 100*a*, and 100*b* through the communication interface 207. The alarm message contains an identifier of a server as the source of the alarm message and the port ID of the port connected to the failed link. The alarm reception unit 211 informs the VLAN determination unit 213 of the contents of the received alarm message.

The table storage unit 212 stores a routing management table, which indicates the status of communication between the virtual machines running on the servers 100, 100*a*, and 100*b*. The routing management table contains information indicating relationships between the servers, the virtual machines, the VLAN-IDs, and the ports. In addition, the table storage unit 212 stores a VLAN-ID table, which indicates VLAN-IDs used in frames flowing into the aggregate-level switch 41 or 42. Further, the table storage unit 212 stores a failure management table, which indicates the failure status of the ports in each server.

When the alarm reception unit 211 receives an alarm message, the VLAN determination unit 213 refers to the table storage unit 212, and determines the servers and the VLAN pertaining to the switching of the forwarding direction. The servers pertaining to the switching of the forwarding direction include the server which detects the failure and one or more other servers which perform communication by using the same VLAN-ID as the server which detects the failure. In the one or more other servers, switching of the forwarding direction is performed for frames containing the same VLAN-ID. The VLAN determination unit 213 informs the instruction transmission unit 214 of the determined servers and VLAN.

In addition, the VLAN determination unit 213 confirms whether or not frames outputted from the server which detects the failure are to be transferred to the aggregate-level switch 41 or 42 under the redundancy control. For example, in the case where the forwarding directions in the one or more other servers cannot be switched, the frames are transferred to the switch 41 or 42. In the case where the frames are transferred to the switch 41 or 42, the VLAN determination unit 213 refers to the table storage unit 212, and determines whether or not collision can occur between frames using the same VLAN-ID in the switch 41 or 42. In the case where frames using the same VLAN-ID can collide in the switch 41 or 42, in order to avoid the collision, the VLAN determination unit 213 determines that the VLAN-ID in the frames transferred to the switch 41 or 42 is to be converted.

The instruction transmission unit 214 transmits to the servers 100, 100*a*, and 100*b* an instruction to switch the forwarding direction on the basis of the determination by the VLAN determination unit 213. The instruction to switch the forwarding direction may contain the VLAN-ID to be converted. In addition, the instruction transmission unit 214 transmits to the switches 300 and 300*a* an instruction to convert the VLAN-ID or an instruction to permit transfer to the switch 41 or 42 of frames containing a specific value of the VLAN-ID, on the basis of the determination by the VLAN determination unit 213. The instruction to convert the VLAN-ID contains a value of the VLAN-ID before the conversion and a value of the VLAN-ID after the conversion.

FIG. 10 illustrates an example of the routing management table stored in the table storage unit 212. The routing management table 215 of FIG. 10 contains the fields of the first and second virtual machines VM1 ad VM2 (which perform communication by use of a VLAN tag), the VLAN-ID, the switch ID, the detour flag, and the converted VLAN-ID. Each of the fields of the first and second virtual machines VM1 and VM2 contains the subfields of the VM-ID, the server ID, and the port ID.

In the subfield of the VM-ID, an identifier of each virtual machine is recorded. In the subfield of the server ID, an identifier (e.g., an IP address) of a server on which each virtual machine is established is recorded. In the subfield of the port ID, an identifier of a port through which frames from each virtual machine are to be outputted is recorded.

In the field of the VLAN-ID, each VLAN-ID used in frames transmitted between two virtual machines is recorded. In the field of the switch ID, an identifier of each server-level switch (e.g., the switch 300 or 300a) which transfers the frames is recorded. In the field of the detour flag, a flag indicating whether or not the frames are relayed by the aggregate-level switches 41 and 42 is recorded. In the field of the converted VLAN-ID, the value of the VLAN-ID which is used when frames are transferred to one of the aggregate-level switches 41 and 42 is recorded.

The information items in the fields of the port ID, the switch ID, the detour flag, and the converted VLAN-ID in the routing management table 215 are updated by the VLAN determination unit 213.

FIG. 11 illustrates an example of the VLAN-ID table stored in the table storage unit 212. The VLAN-ID table 216 of FIG. 11 contains the fields of the VLAN-ID and the use flag. In the field of the VLAN-ID, 4094 values (#1 to #4094) of the VLAN-ID which can be allocated to the users are recorded. In the field of the use flag, a flag indicating whether or not each value of the VLAN-ID is used by one of the aggregate-level switches 41 and 42 is recorded. The information items in the respective fields in the VLAN-ID table 216 are updated by the VLAN determination unit 213.

FIG. 12 illustrates an example of a failure management table stored in the table storage unit 212. The failure management table 217 contains the fields of the server ID, the port ID, and a failure flag. In the field of the server ID, an identifier of each server (e.g., server 100, 100a, or 100b) is recorded. In the field of the port ID, an identifier of each port of the server is recorded. In the field of the failure flag, a flag indicating whether or not a link failure occurs in a link connected to each port is recorded. The information items in the respective fields in the failure management table 217 are updated by the VLAN determination unit 213.

Figure 13:
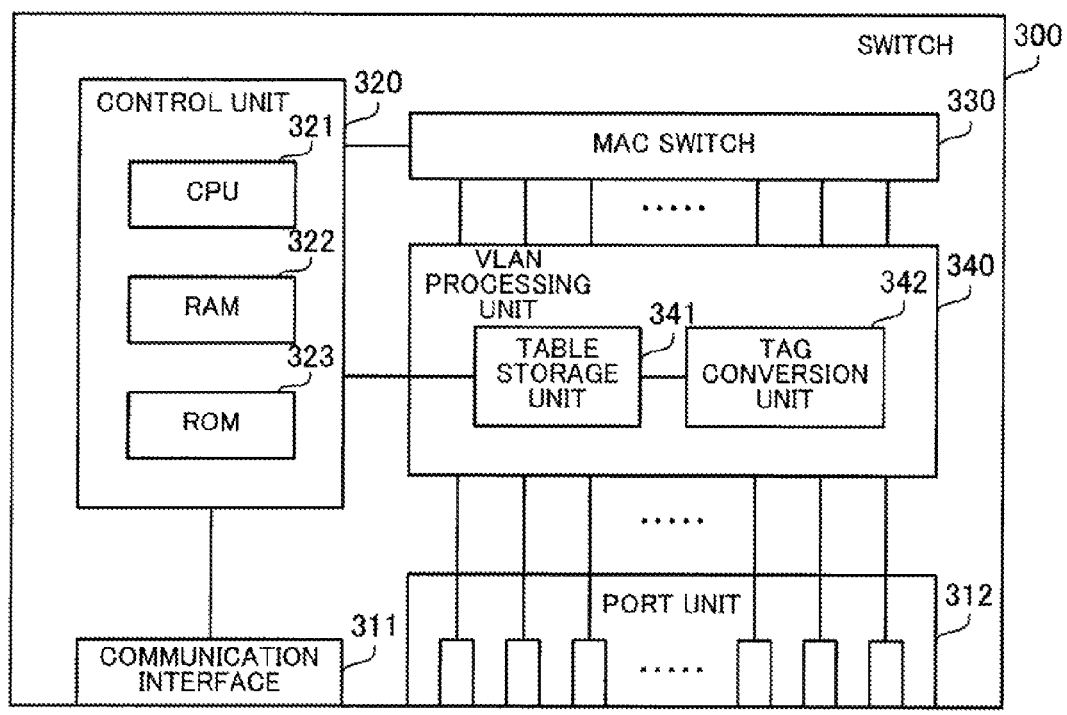
FIG. 13 is a block diagram of an example of a construction of a switch.

FIG. 13 is a block diagram of an example of a construction of the switch 300. The switch 300 illustrated in FIG. 13 contains a communication interface 311, a port unit 312, a control unit 320, a MAC switch 330, and a VLAN processing unit 340. The switch 300a can also be realized by a construction similar to the construction of FIG. 13.

The communication interface 311 is an interface for management which is provided for communication with the management apparatus 200. The port unit 312 contains multiple ports which are respectively connected through cables to the servers 100, 100a, and 100b on the server rack 31 and the aggregate-level switches 41 and 42.

The control unit 320 controls the frame processing performed by the switch 300. For example, when the control unit 320 receives from the management apparatus 200 an instruction to change the correspondence between the VLAN and the port, the control unit 320 instructs the MAC switch 330 to switch the forwarding direction. In addition, when the control unit 320 receives from the management apparatus 200 an instruction to convert the VLAN-ID, the control unit 320 rewrites a table arranged in the VLAN processing unit 340.

In order to realize the above control, the control unit 320 contains a CPU 321, a RAM 322, and a ROM (read only memory) 323. The CPU 321 executes a firmware program. The RAM 322 temporarily stores the firmware program and data. The ROM 323 stores the firmware program and data in advance. The ROM 323 may be a rewritable nonvolatile memory such as a flash memory.

The MAC switch 330 acquires each frame received through each port in the port unit 312, and determines a port through which the frame is to be outputted, on the basis of the VLAN-ID and the destination MAC address which are contained in the frame. The MAC switch 330 may contain a transfer table for use in the determination of the port through which each frames is to be outputted, and update the MAC address recorded in the transfer table by address learning. The MAC switch 330 outputs the frame to be transferred, to the determined port through the VLAN processing unit 340.

The VLAN processing unit 340 acquires from the MAC switch 330 each frame to be transferred, and transfers the frame to the port unit 312. When the frame is transferred, the VLAN-ID contained in the frame is converted in some cases. The VLAN processing unit 340 contains a table storage unit 341 and a tag conversion unit 342.

The table storage unit 341 stores a VLAN conversion table, which indicates correspondences between the VLAN-IDs used in the server rack 31 or 32 and the VLAN-IDs used in the aggregate-level switches 41 and 42. The VLAN conversion table is updated by the control unit 320.

The tag conversion unit 342 determines whether or not the VLAN-ID contained in each frame acquired from the MAC switch 330 is recorded in the VLAN conversion table stored in the table storage unit 341. When yes is determined, the tag conversion unit 342 converts the VLAN-ID contained in the frame by conversion between a VLAN-ID used in the server rack 31 or 32 and a VLAN-ID used in the switch 41 or 42 in accordance with the VLAN conversion table, and then transfers the frame to the port unit 312.

Figure 14:
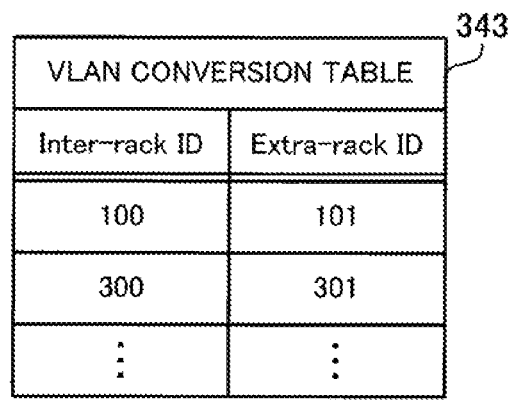
FIG. 14 illustrates an example of a VLAN conversion table.

FIG. 14 illustrates an example of the VLAN conversion table stored in the table storage unit 341. The VLAN conversion table 343 contains the fields of the inter-rack ID and the extra-rack ID. In the field of the inter-rack ID, VLAN-IDs used in the servers 100, 100a, and 100b are recorded. In the field of the extra-rack ID, VLAN-IDs respectively corresponding to the inter-rack IDs and being used in the switches 41 and 42 are recorded.

Before a frame containing an inter-rack ID (recorded in the VLAN conversion table 343) is transferred from the server rack 31 to the switch 41 or 42, the inter-rack ID is converted to the corresponding extra-rack ID. In addition, when a frame containing an extra-rack ID (recorded in the VLAN conversion table 343) is transferred from the switch 41 or 42 to the server rack 31 or 32, the extra-rack ID is converted to the corresponding inter-rack ID.

Figure 15:
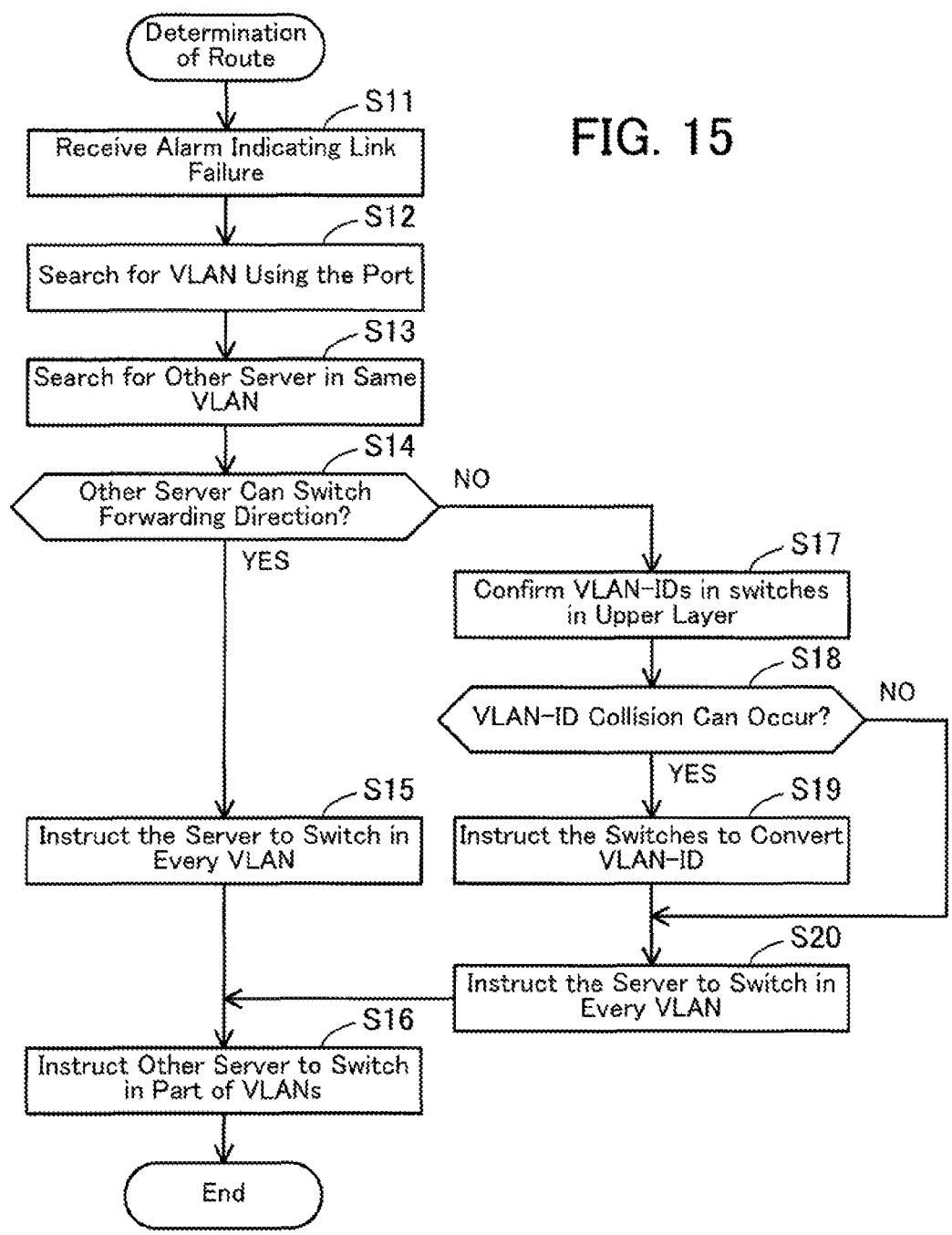
FIG. 15 is a flow diagram indicating processing for determining a route.

FIG. 15 is a flow diagram indicating processing for determining a route, which is performed by the management apparatus 200. The processing of FIG. 15 is explained below step by step.

<Step S11> The alarm reception unit 211 receives from one of the servers an alarm message indicating detection of a link failure. The alarm message contains an identifier of the server as the source of the alarm message and an identifier of the port connected to the failed link.

<Step S12> The VLAN determination unit 213 searches the routing management table 215 stored in the table storage unit 212 for a VLAN using the port indicated by the alarm message.

<Step S13> The VLAN determination unit 213 searches the routing management table 215 for one or more other servers which transmit frames in the VLAN searched for in step S12.

<Step S14> The VLAN determination unit 213 refers to the failure management table 217 stored in the table storage unit 212, and determines whether or not each of the one or more other servers searched for in step S13 can switch the forwarding direction. When one of the one or more other servers searched for in step S13 has a normal port other than the currently used port, the VLAN determination unit 213 determines that the server searched for in step S13 can switch the forwarding direction. In the case where all of the one or more other servers searched for in step S13 are determined to be able to switch the forwarding direction, the operation goes to step S15. In the case where at least one of the one or more other servers searched for in step S13 is determined not to be able to switch the forwarding direction, the operation goes to step S17.

<Step S15> The instruction transmission unit 214 transmits to the server as the source of the alarm message an instruction to switch the forwarding direction in every VLAN.

<Step S16> The instruction transmission unit 214 transmits, to the one or more other servers which are searched for in step S13, an instruction to switch the forwarding direction for the VLAN searched for in step S12. The VLAN determination unit 213 updates the routing management table 215 and the failure management table 217 in accordance with the results of the switching of the forwarding direction.

<Step S17> The VLAN determination unit 213 refers to the VLAN-ID table 216 stored in the table storage unit 212, and confirms VLAN-IDs which are already used in the frames flowing into the aggregate-level switch 41 or 42.

<Step S18> The VLAN determination unit 213 determines whether or not the VLAN-ID searched for in step S12 can cause collision in the switch 41 or 42 (i.e., whether or not the VLAN-ID searched for in step S12 is already used in a frame flowing into the switch 41 or 42). When yes is determined in step S18, the operation goes to step S19. When no is determined in step S18, the operation goes to step S20.

<Step S19> The VLAN determination unit 213 selects from the VLAN-IDs in the VLAN-ID table 216 a VLAN-ID which does not cause collision in the switches 41 and 42. The instruction transmission unit 214 instructs the switches 300 and 300a to make a conversion between the VLAN-ID searched for in step S12 and the VLAN-ID selected by the VLAN determination unit 213. The VLAN determination unit 213 updates the VLAN-ID table 216.

<Step S20> The instruction transmission unit 214 transmits to the server as the source of the alarm message an instruction to switch the forwarding direction in every VLAN. The VLAN determination unit 213 updates the routing management table 215 and the failure management table 217. In addition, the operation goes to step S16, in which the instruction transmission unit 214 transmits, to the one or more other servers which are searched for in step S13, an instruction to switch the forwarding direction for the VLAN searched for in step S12. The instruction transmission unit 214 may transmit the instruction to the servers 100, 100a, and 100b and the instruction to the switches 300 and 300a in arbitrary order.

Figure 16:
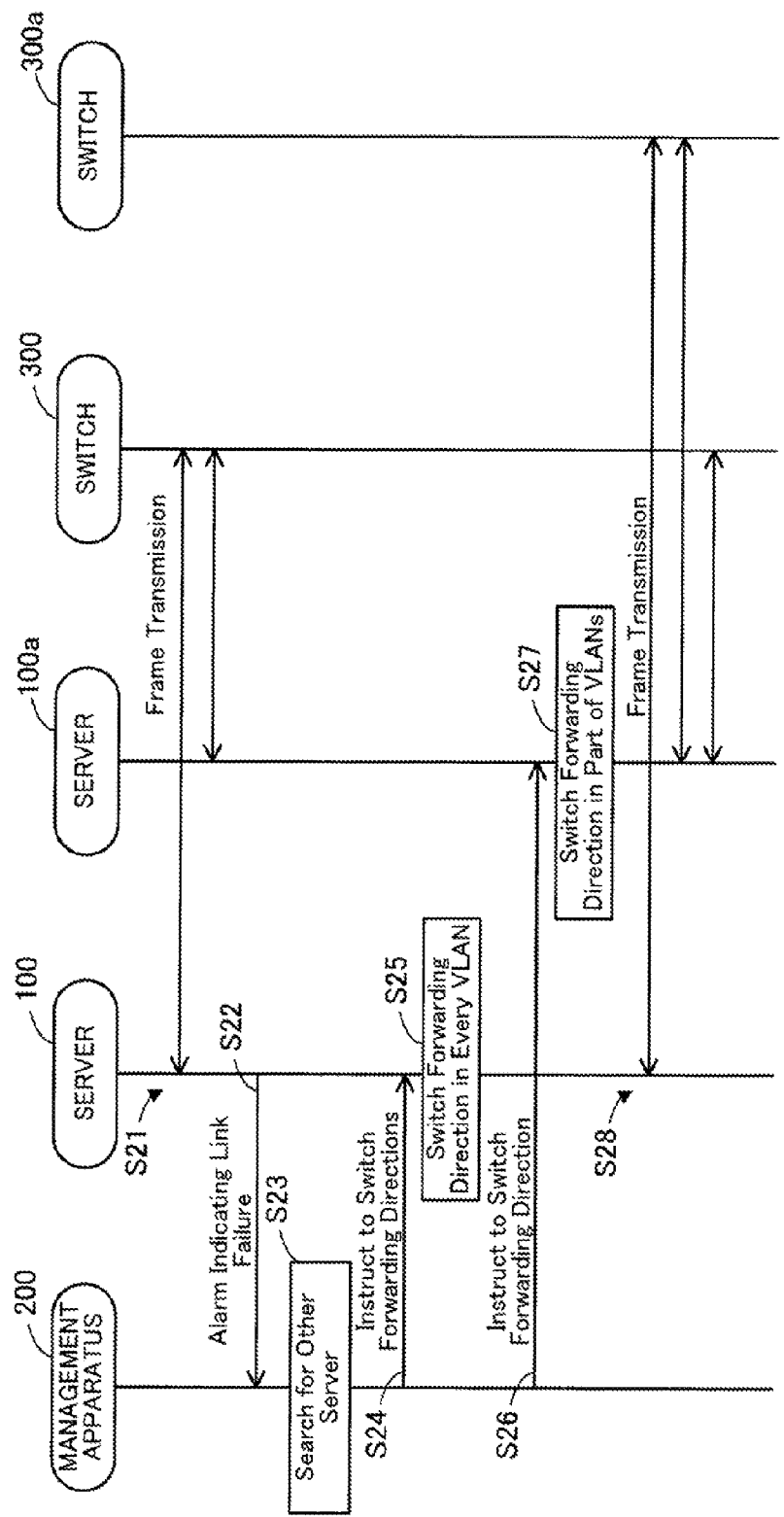
FIG. 16 is a sequence diagram indicating a first sequence of redundancy control.

FIG. 16 is a sequence diagram indicating a first sequence of redundancy control. In the example of FIG. 16, it is assumed that the port 111 of the server 100 is connected to the switch 300, the port 112 of the server 100 is connected to the switch 300a, the port 111a of the server 100a is connected to the switch 300, the port 112a of the server 100a is connected to the switch 300a, the server 100 performs communication by using a VLAN-ID, and the server 100a performs communication by using the same VLAN-ID as the server 100 and another VLAN-ID.

<Step S21> The server 100 outputs frames to the switch 300. Similarly, the server 100a outputs frames to the switch 300.

<Step S22> The server 100 detects a link failure at the port 111 (to which the switch 300 is connected). The server 100 transmits to the management apparatus 200 an alarm message indicating that a failure is detected at the port 111.

<Step S23> The management apparatus 200 searches for a VLAN in which frames are transmitted through the port 111 of the server 100, and another server (the server 100a in the example of FIG. 16) in which frames in the VLAN searched for are transmitted. In addition, the management apparatus 200 confirms that the other server (e.g., the server 100a) can switch the forwarding direction.

<Step S24> The management apparatus 200 instructs the server 100 to switch the forwarding direction.

<Step S25> The server 100 switches the forwarding direction of frames from the port 111 to the port 112 (to which the switch 300a is connected).

<Step S26> The management apparatus 200 sends to the server 100a an instruction to switch the forwarding direction, where the VLAN-ID of the VLAN searched for in step S23 is designated in the instruction.

<Step S27> The server 100a switches the forwarding direction of frames each containing the designated VLAN-ID from the port 111a (connected to the switch 300) to the port 112a (connected to the switch 300a). However, the forwarding direction of the frames which do not contain the designated VLAN-ID is maintained at the port 111a.

<Step S28> The server 100 outputs the frames to the switch 300a. The server 100a outputs the frames in the same VLAN as the server 100 to the switch 300a, and outputs frames in the other VLAN to the switch 300.

Figure 17:
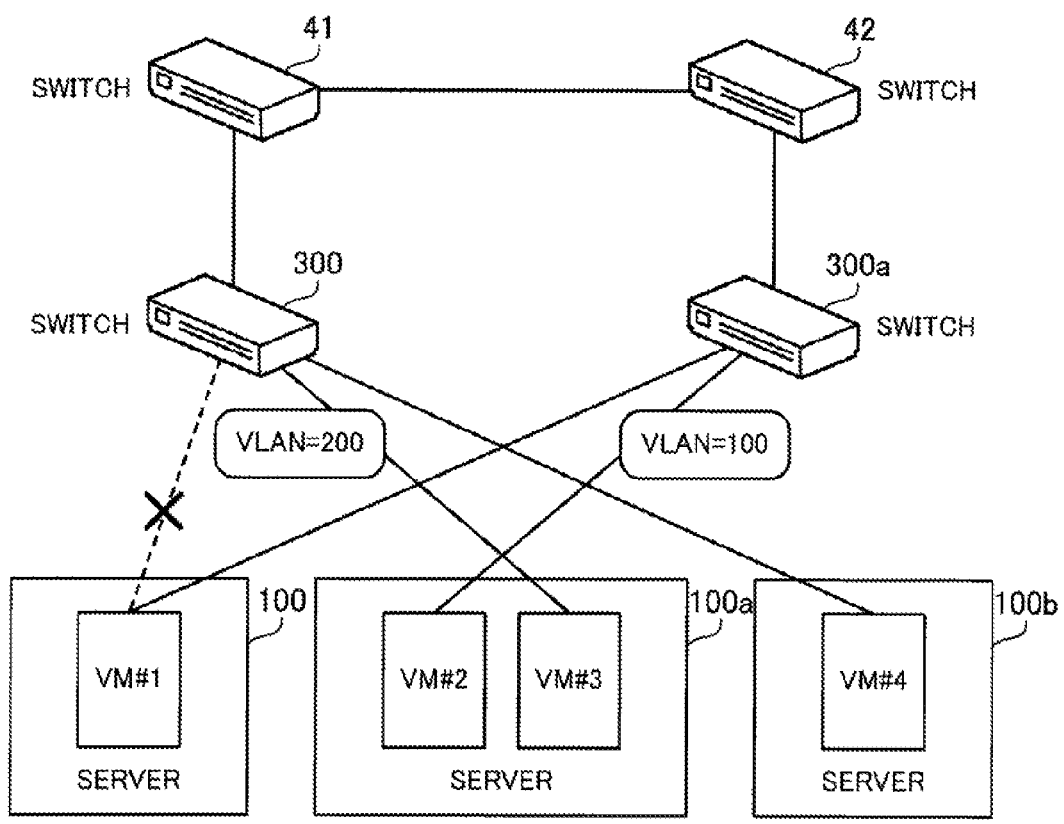
FIG. 17 illustrates a first example of route change for frame transmission.

FIG. 17 illustrates a first example of route change for frame transmission. In the example of FIG. 17, it is assumed that the virtual machine #1 running on the server 100 and the virtual machine #2 running on the server 100a perform communication by using the VLAN-ID "100", and the virtual machine #3 running on the server 100a and the virtual machine #4 running on the server 100b perform communication by using the VLAN-ID "200". During normal operation (i.e., while no link failure occurs), the servers 100, 100a, and 100b output frames containing the above VLAN-IDs to the switch 300.

When a link failure occurs in the link between the server 100 and the switch 300, the server 100 switches the destination of the frames from the switch 300 to the switch 300a. In association with this, the server 100a switches the forwarding direction of the frames being outputted from the virtual machine #2 containing the VLAN-ID "100" from the switch 300 to the switch 300a. On the other hand, the server 100b, which does not transmit frames containing the VLAN-ID "100", does not switch the forwarding direction. In addition, the server 100a maintains the forwarding direction of frames being outputted from the virtual machine #3 and containing the VLAN-ID "200" at the switch 300. Therefore, after the detection of the link failure in the link between the server 100 and the switch 300, the virtual machines #1 and #2 transmit and receive frames containing the VLAN-ID "100" through the switch 300a, while the virtual machines #3 and #4 still transmit and receive frames containing the VLAN-ID "200" through the switch 300. Thus, the frames containing the VLAN-ID "100" or "200" are transmitted in the closed region at and under the level of the switches 300 and 300a (on the server rack side), and are not transferred to the aggregate-level switch 41 or 42.

Figure 18:
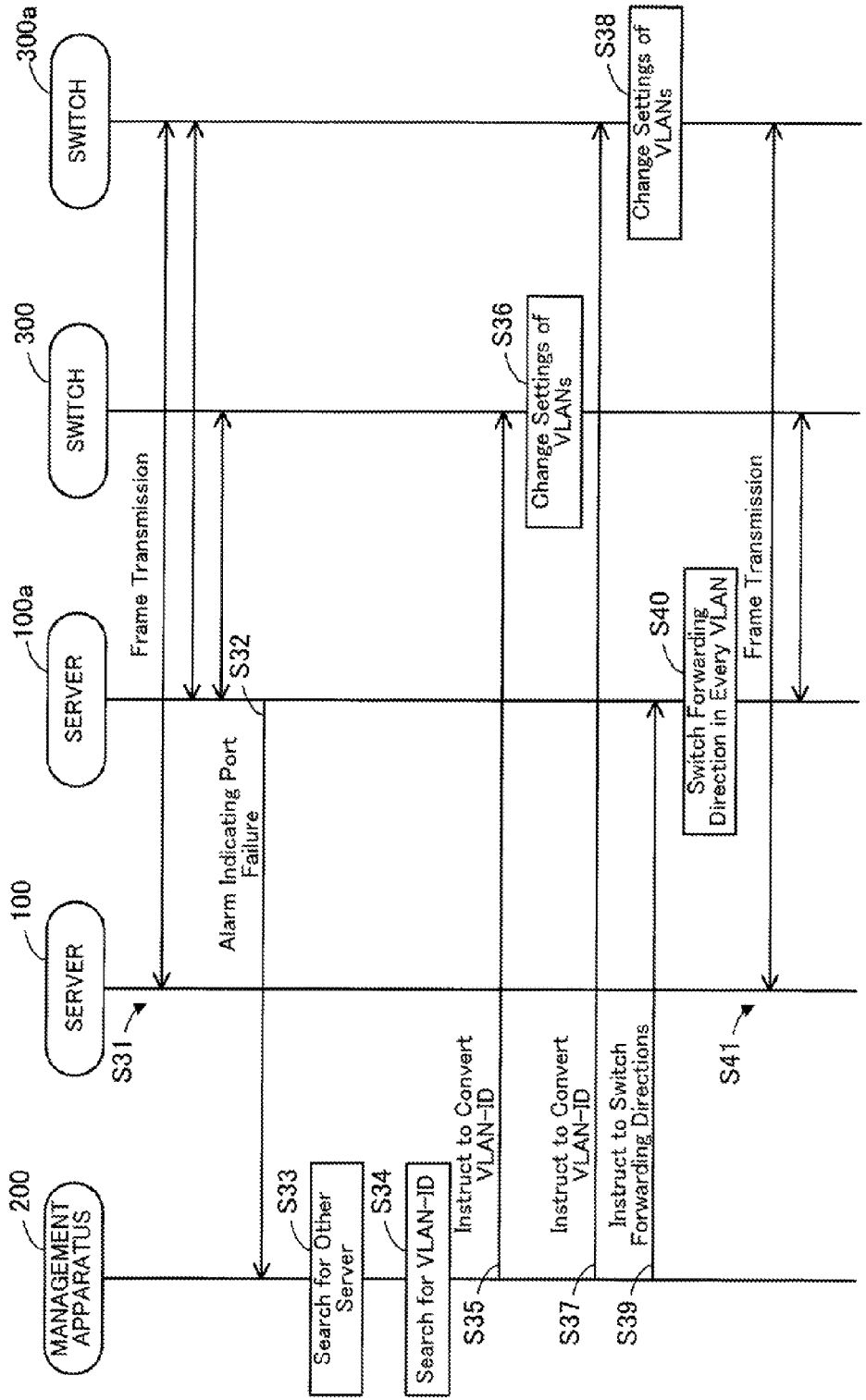
FIG. 18 is a sequence diagram indicating a second sequence of redundancy control.

FIG. 18 is a sequence diagram indicating a second sequence of redundancy control. The sequence of FIG. 18 is executed after the sequence of FIG. 16.

<Step S31> The server 100 outputs frames to the switch 300a. The server 100a outputs frames in the same VLAN as the server 100 to the switch 300a, and outputs the frames in the other VLAN to the switch 300.

<Step S32> The server 100*a* detects a link failure at the port 112*a* (to which the switch 300*a* is connected). Then, the server 100*a* transmits to the management apparatus 200 an alarm message indicating that the failure is detected at the port 112*a*.

<Step S33> The management apparatus 200 searches for a VLAN in which frames are transmitted by using the port 112*a* of the server 100*a*. Then, the management apparatus 200 searches for the other server which transmits frames in the VLAN searched for (i.e., the server 100 in the example of FIG. 18). In addition, the management apparatus 200 confirms that the other server cannot switch the forwarding direction.

<Step S34> The management apparatus 200 confirms that the VLAN-ID of the VLAN searched for in step S33 is already used by the aggregate-level switch 41 or 42. Then, the management apparatus 200 searches for a VLAN-ID which is not yet used by the aggregate-level switch 41 or 42.

<Step S35> The management apparatus 200 permits the switch 300 to transfer to the switch 41 the frames in the VLAN searched for in step S33. In addition, the management apparatus 200 instructs the switch 300 to convert the VLAN-ID in the frames to a VLAN-ID which is not yet used by the aggregate-level switch 41 or 42.

<Step S36> The switch 300 changes the setting for transfer of frames in the VLAN searched for in step S33, and makes settings for conversion of the VLAN-ID.

<Step S37> The management apparatus 200 permits the switch 300*a* to transfer to the switch 42 frames in the VLAN searched for in step S33. In addition, the management apparatus 200 instructs the switch 300*a* to convert the VLAN-ID of the VLAN to the VLAN-ID which is not yet used by the aggregate-level switch 41 or 42.

<Step S38> The switch 300*a* changes the setting for transfer of frames in the VLAN searched for in step S33. The switch 300*a* makes the settings for conversion of the VLAN-ID.

<Step S39> The management apparatus 200 instructs the server 100*a* to switch the forwarding direction.

<Step S40> The server 100*a* switches the forwarding direction of frames from the port 112*a* to the port 111*a* (connected to the switch 300).

<Step S41> The server 100 outputs frames to the switch 300*a*. The server 100*a* outputs frames to the switch 300.

Figure 19:
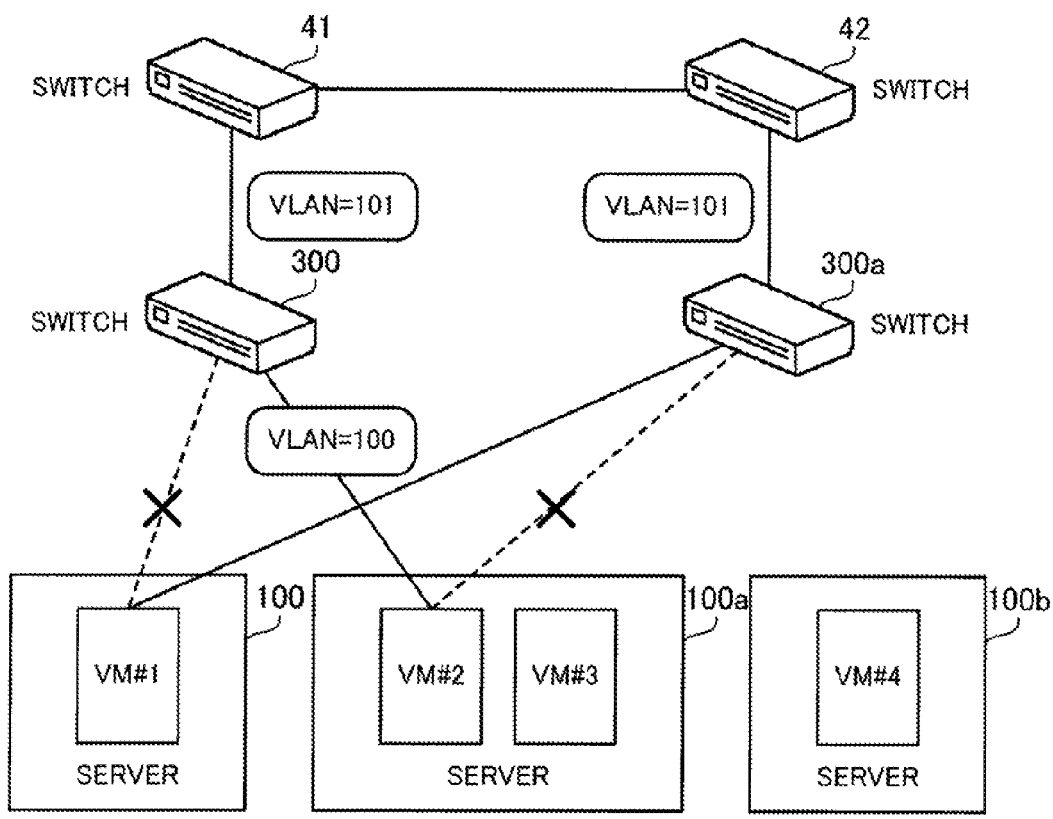
FIG. 19 illustrates a second example of route change for frame transmission.

FIG. 19 illustrates a second example of route change for frame transmission. The example of the change illustrated in FIG. 19 is assumed to be made after the changes of the routes illustrated in FIG. 17 are made. Therefore, before the change of the route illustrated in FIG. 19 is made, the virtual machine #1 running on the server 100 and the virtual machine #2 running on the server 100*a* perform communication through the switch 300*a* by using the VLAN-ID "100".

When a further link failure occurs in the link between the server 100*a* and the switch 300*a* in the above situation (i.e., when a double failure occurs), the server 100*a* returns the forwarding direction from the switch 300*a* to the switch 300, since no failure is detected at the port 111*a* connected to the switch 300. On the other hand, the server 100 cannot return the forwarding direction to the switch 300, since the aforementioned failure is detected at the port 111 connected to the switch 300. Therefore, the management apparatus 200 determines to transfer frames containing the VLAN-ID "100" to the aggregate-level switch 41 or 42. At this time, the management apparatus 200 determines to convert the VLAN-ID "100" in the frames to the VLAN-ID "101", which is not yet used by the switches 41 and 42.

Thus, the frames containing the VLAN-ID "100" and being addressed to the virtual machine #2 and outputted from the virtual machine #1 are transferred from the server 100 to the switch 300*a*. The VLAN-ID "100" in the transferred frames is converted to the VLAN-ID "101" in the switch 300*a*, and the frames containing the VLAN-ID "101" are transferred from the switch 300*a* to the switch 42. The frames containing the VLAN-ID "101" are then transferred from the switch 42 through the switch 41 to the switch 300. The VLAN-ID "101" in the frames from the switch 300*a* to the switch 42 is converted to the VLAN-ID "100" in the switch 300, and the frames containing the VLAN-ID "100" are transferred from the switch 300 to the virtual machine #2. Similarly, the frames containing the VLAN-ID "100" and being addressed to the virtual machine #1 are transferred from the virtual machine #2 on the server 100*a* to the virtual machine #1 on the server 100 along the reverse route.

As explained above, in the communication system according to the third embodiment, a plurality of virtual machines belonging to an identical VLAN are arranged on a server rack as long as possible. Therefore, during normal operation (i.e., while no link failure occurs), frames containing a VLAN tag are transferred basically between the apparatuses on the server racks 31 and 32.

In addition, when a link failure occurs in one of the links between the apparatuses on the server racks 31 and 32, the forwarding direction is switched in the server which detects the link failure and one or more other related servers. Therefore, it is possible to suppress transfer of the frames containing a VLAN tag to the aggregate-level switch 41 or 42. In addition, in the case where a double link failure occurs on the server racks 31 and 32, and frames are transferred to the aggregate-level switch 41 or 42, the VLAN-ID is converted so as to avoid VLAN-ID collision in the aggregate-level switches 41 and 42.

Further, the communication system according to the third embodiment is controlled so as to avoid VLAN-ID collision in each switch during both of the normal operation and the operation performed in response to occurrence of a link failure. Therefore, a plurality of VLANs using an identical VLAN-ID can be formed in a single layer-2 network (in a broadcast domain in the MAC layer).

As explained above, according to the third embodiment, it is possible to suppress occurrence of collision of tag information in frames even when a failure occurs.

The redundancy control according to the third embodiment can be realized when each of the servers 100, 100*a*, and 100*b* and the management apparatus 200 as a computer executes a program. The program describing the details of the processing can be stored in a computer-readable recording medium (e.g., the aforementioned recording medium 53 illustrated in FIG. 8), which can be read by the computer. The computer-readable recording medium may be a magnetic recording device, an optical disk, an optical magnetic recording medium, a semiconductor memory, or the like. The magnetic recording device may be a flexible disk (FD) or a hard disk drive (HDD). The optical disk may be a CD (Compact Disk), a CD-R (Recordable)/RW (ReWritable), a DVD (Digital Versatile Disk), a DVD-R/RW, or the like.

In order to put the program into the market, for example, it is possible to sell a portable recording medium in which the program is recorded. Alternatively, it is possible to store the program in a storage device belonging to a server computer, and distribute the program to another computer through a network.

Each computer which executes the program stores the program in a storage device (e.g., the aforementioned HDD 203 illustrated in FIG. 8) belonging to the computer, where the program is originally recorded in, for example, a portable recording medium, or is initially transferred from another computer. The computer reads the program from the storage device, and performs processing in accordance with the program. Alternatively, the computer may directly read the program from the portable recording medium for performing processing in accordance with the program. Further alternatively, each computer can sequentially execute processing in accordance with each portion of a program every time the portion of the program is transferred from another computer.

4. Additional Matters

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control method which is executed in a system including a first communication apparatus and a second communication apparatus connected through a third communication apparatus and a plurality of information processing apparatuses each connected to both of the first communication apparatus and the second communication apparatus, the communication control method comprising:
    outputting frames from the plurality of information processing apparatuses to the first communication apparatus for communication;
    when a failure in a link between the first communication apparatus and a first one of the plurality of information processing apparatuses is detected, switching a forwarding direction of first frames containing tag information and being outputted from the first one of the plurality of information processing apparatuses, from a first direction toward the first communication apparatus to a second direction toward the second communication apparatus, the first one of the plurality of information processing apparatuses using a first address;
    searching for a second one of the plurality of information processing apparatuses which uses the tag information in common with the first one of the plurality of information processing apparatuses, the second one of the plurality of information processing apparatuses using a second address different from the first address; and
    switching a forwarding direction of second frames containing the tag information used in common with the first one of the plurality of information processing apparatuses and being outputted from the second one of the plurality of information processing apparatuses, from a third direction toward the first communication apparatus to a fourth direction toward the second communication apparatus,
    wherein in the case where the forwarding direction of the second frames containing the tag information used in common with the first one of the plurality of information processing apparatuses and being outputted from the second one of the plurality of information processing apparatuses cannot be switched to the fourth direction toward the second communication apparatus, the first communication apparatus converts the tag information contained in the second frames outputted from the second one of the plurality of information processing apparatuses to other tag information and transfers the second frames containing the other tag information to the third communication apparatus, and the second communication apparatus converts the tag information contained in the first frames outputted from the first one of the plurality of information processing apparatuses to the other tag information and transfers the first frames containing the other tag information to the third communication apparatus.

2. The communication control method according to claim 1, wherein, after the failure is detected, the second one of the plurality of information processing apparatuses outputs to the second communication apparatus the second frames containing the tag information used in common with the first one of the plurality of information processing apparatuses, and outputs other frames to the first one of the plurality of information processing apparatuses.

3. The communication control method according to claim 1, wherein a plurality of virtual machines run on the second one of the plurality of information processing apparatuses, and it is determined, for each of the plurality of virtual machines, whether or not the second one of the plurality of information processing apparatuses outputs the second frames containing the tag information used in common with the first one of the plurality of information processing apparatuses.

4. A communication control method which is executed in a system including a first communication apparatus and a second communication apparatus connected through a third communication apparatus and a plurality of information processing apparatuses each connected to both of the first communication apparatus and the second communication apparatus, the communication control method comprising:
    outputting first frames containing first tag information from a first one of the plurality of information processing apparatuses to the first communication apparatus for communication, and outputting second frames containing the first tag information from a second one of the plurality of information processing apparatuses to the first communication apparatus for communication;
    when a failure in a link between the first communication apparatus and the first one of the plurality of information processing apparatuses is detected, switching a forwarding direction of the first frames outputted from the first one of the plurality of information processing apparatuses, from a first direction toward the first communication apparatus to a second direction toward the second communication apparatus;
    in the case where the first tag information is not used by the third communication apparatus after the failure is detected, transferring the second frames from the first communication apparatus to the third communication apparatus, and transferring the first frames from the second communication apparatus to the third communication apparatus; and
    in the case where the first tag information is used by the third communication apparatus after the failure is detected, converting, by the first communication apparatus, the first tag information contained in the second frames to second tag information, transferring the second frames containing the second tag information from the first communication apparatus to the third communication apparatus, converting, by the second communication apparatus, the first tag information contained in the first frames to the second tag information, and transferring the first frames containing the second tag information from the second communication apparatus to the third communication apparatus.

5. A management apparatus used in a system including a first communication apparatus and a second communication apparatus connected through a third communication apparatus and a plurality of information processing apparatuses each connected to both of the first communication apparatus and the second communication apparatus, the management apparatus comprising:

a memory which stores management information indicating correspondences between the plurality of information processing apparatuses and tag information; and a processor configured to perform a procedure including:

when a failure in a link between the first communication apparatus and a first one of the plurality of information processing apparatuses is detected, searching the management information for a second one of the plurality of information processing apparatuses which uses tag information in common with the first one of the plurality of information processing apparatuses, the first one of the plurality of information processing apparatuses using a first address, the second one of the plurality of information processing apparatuses using a second address different from the first address, instructing the first one of the plurality of information processing apparatuses to switch a forwarding direction of first frames containing the tag information used in common with the second one of the plurality of information processing apparatuses and being outputted from the first one of the plurality of information processing apparatuses, from a first direction toward the first communication apparatus to a second direction toward the second communication apparatus, and instructing the second one of the plurality of information processing apparatuses to switch a forwarding direction of second frames containing the tag information used in common with the first one of the plurality of information processing apparatuses and being outputted from the second one of the plurality of information processing apparatuses, from a third direction toward the first communication apparatus to a fourth direction toward the second communication apparatus, wherein in the case where the forwarding direction of the second frames containing the tag information used in common with the first one of the plurality of information processing apparatuses and being outputted from the second one of the plurality of information processing apparatuses cannot be switched to the fourth direction toward the second communication apparatus, the first communication apparatus converts the tag information contained in the second frames outputted from the second one of the plurality of information processing apparatuses to other tag information and transfers the second frames containing the other tag information to the third communication apparatus, and the second communication apparatus converts the tag information contained in the first frames outputted from the first one of the plurality of information processing apparatuses to the other tag information and transfers the first frames containing the other tag information to the third communication apparatus.

* * * * *